*(12)* United States Patent
Hemphill et al.

*(10)* Patent No.: US 10,703,303 B2
*(45)* Date of Patent: Jul. 7, 2020

(54) TAILGATE ACCESSORY MOUNTING SYSTEMS

(71) Applicant: FORD GLOBAL TECHNOLOGIES, LLC, Dearborn, MI (US)

(72) Inventors: Joshua Robert Hemphill, White Lake, MI (US); Craig Angelo Moccio, Milan, MI (US); Brian Kenneth Sullivan, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 84 days.

(21) Appl. No.: 15/678,437

(22) Filed: Aug. 16, 2017

(65) Prior Publication Data

US 2019/0054866 A1 Feb. 21, 2019

(51) Int. Cl.
*B60R 11/06* (2006.01)
*B62D 33/027* (2006.01)
*B60R 11/00* (2006.01)

(52) U.S. Cl.
CPC .......... *B60R 11/06* (2013.01); *B62D 33/0273* (2013.01); *B60R 2011/0021* (2013.01); *B60R 2011/0052* (2013.01)

(58) Field of Classification Search
CPC .............. B62D 33/02; B62D 33/0207; B62D 33/0273; B60R 11/06; B60R 2011/0021; B60R 2011/0052; Y10T 403/7094; F16B 5/0052; F16B 2200/30; F16B 2200/403
USPC .............. 296/26.09, 50, 57.1, 37.6; 248/674, 248/225.11, 298.1; 224/403–405; 410/104
See application file for complete search history.

(56) References Cited

U.S. PATENT DOCUMENTS

| | | | | |
|---|---|---|---|---|
| 4,023,850 A | * | 5/1977 | Tillery | B62D 33/0273 296/26.08 |
| 4,705,254 A | | 11/1987 | Swanson | |
| 4,993,088 A | * | 2/1991 | Chudik | A47C 17/80 108/44 |
| 5,098,146 A | * | 3/1992 | Albrecht | B60P 1/52 108/44 |
| 5,205,603 A | * | 4/1993 | Burdette, Jr. | B60R 3/02 182/195 |
| 5,649,731 A | * | 7/1997 | Tognetti | B60P 1/003 296/26.09 |
| 5,992,915 A | * | 11/1999 | Thompson | B60R 13/01 296/39.2 |
| 6,312,034 B1 | * | 11/2001 | Coleman, II | B60P 1/003 296/26.09 |
| 6,422,342 B1 | * | 7/2002 | Armstrong | B60R 3/02 182/127 |
| 6,464,274 B2 | * | 10/2002 | Mink | B60P 1/003 296/26.09 |
| 6,503,036 B1 | * | 1/2003 | Bequette | B60P 3/40 410/121 |

(Continued)

*Primary Examiner* — Terrell L McKinnon
*Assistant Examiner* — Michael McDuffie
(74) *Attorney, Agent, or Firm* — David B. Kelley; Carlson, Gaskey & Olds (57) ABSTRACT

A tailgate accessory mounting system includes a first track, a first anchoring bolt slidably received within a slot of the first track, and a mounting plate secured to the first track by the first anchoring bolt. The tailgate accessory mounting system may be secured to a tailgate of a vehicle, such as a pickup truck, for example.

24 Claims, 7 Drawing Sheets

(56) References Cited

U.S. PATENT DOCUMENTS

| | | | | |
|---|---|---|---|---|
| 6,799,927 B2* | 10/2004 | Wheatley | ............. | B61D 45/001 410/104 |
| 7,416,234 B2* | 8/2008 | Bequette | ................ | B60P 1/003 296/26.08 |
| 7,513,557 B2 | 4/2009 | Leigh-Monstevens | | |
| 7,513,726 B1* | 4/2009 | Comiskey, Jr. | ........... | B60P 3/40 296/3 |
| 7,712,811 B2* | 5/2010 | Heaman | ............. | B62D 33/0273 296/26.08 |
| 7,862,269 B2* | 1/2011 | Kovie | ...................... | B60P 3/14 296/41 |
| 7,905,532 B2 | 3/2011 | Johnson | | |
| 8,007,021 B2 | 8/2011 | Pleet et al. | | |
| 9,067,525 B1* | 6/2015 | Ninov | ...................... | B60P 1/43 |
| 9,863,576 B1* | 1/2018 | Cifers | .................... | F16M 13/02 |
| 10,023,248 B1* | 7/2018 | Harlan | ............... | B62D 33/0273 |
| 2002/0109368 A1* | 8/2002 | Mink | .................... | B60P 1/003 296/26.13 |
| 2002/0109376 A1* | 8/2002 | Gruich | .................... | B60R 9/00 296/181.5 |
| 2002/0140245 A1* | 10/2002 | Coleman, II | ........... | B60P 1/003 296/26.09 |
| 2005/0062309 A1 | 3/2005 | Juzwiak et al. | | |
| 2008/0014041 A1* | 1/2008 | Randazzo | ............ | B60P 7/0815 410/104 |
| 2008/0101883 A1* | 5/2008 | Derecktor | ............ | B60P 7/0815 410/104 |
| 2009/0274531 A1* | 11/2009 | Townson | ............... | B60P 7/0815 410/104 |
| 2010/0019523 A1* | 1/2010 | Fletcher | .................... | B60N 2/01 296/64 |
| 2011/0163565 A1* | 7/2011 | Zielinsky | ........... | B62D 33/0273 296/57.1 |
| 2011/0271878 A1* | 11/2011 | Parks | ........................ | B60P 3/14 108/44 |
| 2012/0061899 A1 | 3/2012 | Trombly | | |
| 2013/0094930 A1* | 4/2013 | Kalergis | ................... | B60P 1/43 414/523 |
| 2015/0014502 A1* | 1/2015 | McCaughan | ...... | B62D 33/0273 248/229.2 |
| 2015/0084361 A1* | 3/2015 | McDermott, III | .......................... | B62D 33/0273 296/57.1 |
| 2015/0217703 A1* | 8/2015 | Deming | .................. | B60R 11/06 224/519 |
| 2015/0360598 A1* | 12/2015 | Lawhon | .................. | B60P 3/40 280/491.5 |
| 2016/0107559 A1* | 4/2016 | Russo | .................. | B60P 1/4485 414/540 |
| 2016/0144796 A1* | 5/2016 | Bexar | ....................... | B60R 9/06 296/37.6 |
| 2017/0050551 A1* | 2/2017 | Smith | .................... | B60R 11/04 |
| 2017/0073023 A1 | 3/2017 | Feight | | |
| 2017/0297468 A1* | 10/2017 | Wereski | ............. | B62D 33/0273 |

* cited by examiner

TAILGATE ACCESSORY MOUNTING SYSTEMS

TECHNICAL FIELD

This disclosure relates to tailgate accessory mounting systems for securing accessory devices to vehicle tailgates.

BACKGROUND

A pickup truck is a vehicle that includes a cargo bed area that is used to transport various types of items. A tailgate typically encloses one end of the cargo bed area. The tailgate can be pivoted to an open position to provide access to the cargo bed area. Many pickup truck owners desire to use the tailgate for numerous other purposes, such as when on a job site or during social/recreational events. Existing tailgates do not provide much versatility for accommodating these desires.

SUMMARY

A tailgate accessory mounting system according to an exemplary aspect of the present disclosure includes, among other things, a first track, a first anchoring bolt slidably received within a slot of the first track, and a mounting plate secured to the first track by the first anchoring bolt.

In a further non-limiting embodiment of the foregoing system, the system includes a second track and a second anchoring bolt slidably received within a slot of the second track.

In a further non-limiting embodiment of either of the foregoing systems, the mounting plate is secured to the second track by the second anchoring bolt.

In a further non-limiting embodiment of any of the foregoing systems, the first track includes a bottom wall and opposing side walls that extend upwardly from the bottom wall, and the bottom wall and the opposing side walls circumscribe the slot.

In a further non-limiting embodiment of any of the foregoing systems, the first track is received within a groove of a tailgate and is bolted to a reinforcement rail of the tailgate.

In a further non-limiting embodiment of any of the foregoing systems, the first anchoring bolt includes a platform received within the slot and a shaft that extends from the platform to a position outside of the slot.

In a further non-limiting embodiment of any of the foregoing systems, an anchoring nut is received over the shaft to secure the mounting plate to the first track.

In a further non-limiting embodiment of any of the foregoing systems, the first track extends along a first longitudinal axis that is transverse to a second longitudinal axis of a tailgate.

In a further non-limiting embodiment of any of the foregoing systems, an accessory device is mounted to the mounting plate.

In a further non-limiting embodiment of any of the foregoing systems, the accessory device is a saw or a vice.

In a further non-limiting embodiment of any of the foregoing systems, the accessory device is a tailgating setup assembly.

A vehicle according to another exemplary aspect of the present disclosure includes, among other things, a tailgate and an accessory mounting system secured to the tailgate and including a track secured to the tailgate, an anchoring bolt received within the track, and a mounting plate secured to the track by the anchoring bolt.

In a further non-limiting embodiment of any of the foregoing systems, the vehicle is a pickup truck.

In a further non-limiting embodiment of any of the foregoing systems, the track is secured to a reinforcement rail of the tailgate.

In a further non-limiting embodiment of any of the foregoing systems, the track is received within a groove of the tailgate and sits flush with an internal surface of the tailgate.

In a further non-limiting embodiment of any of the foregoing systems, the track is received within a groove of the tailgate and protrudes outwardly of an internal surface of the tailgate.

In a further non-limiting embodiment of any of the foregoing systems, the mounting plate includes a blocking extension that extends across a gap between the tailgate and a cargo bed area of the vehicle.

In a further non-limiting embodiment of any of the foregoing systems, an accessory device is mounted to the mounting plate.

In a further non-limiting embodiment of any of the foregoing systems, the accessory device is a saw or a vice.

In a further non-limiting embodiment of any of the foregoing systems, the accessory device is a tailgating setup assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details tailgate accessory mounting systems for securing accessory devices to vehicle tailgates. An exemplary tailgate accessory mounting system includes a track, an anchoring bolt slidably received within a slot of the track, and a mounting plate secured to the track by the anchoring bolt. The track may be secured to a structure of the tailgate, such as a tailgate reinforcement rail, for example. Various accessory devices may be secured to a surface of the mounting plate, including but not limited to, work equipment and tailgating equipment. These and other features of this disclosure are described in greater detail below.

Figure 1:
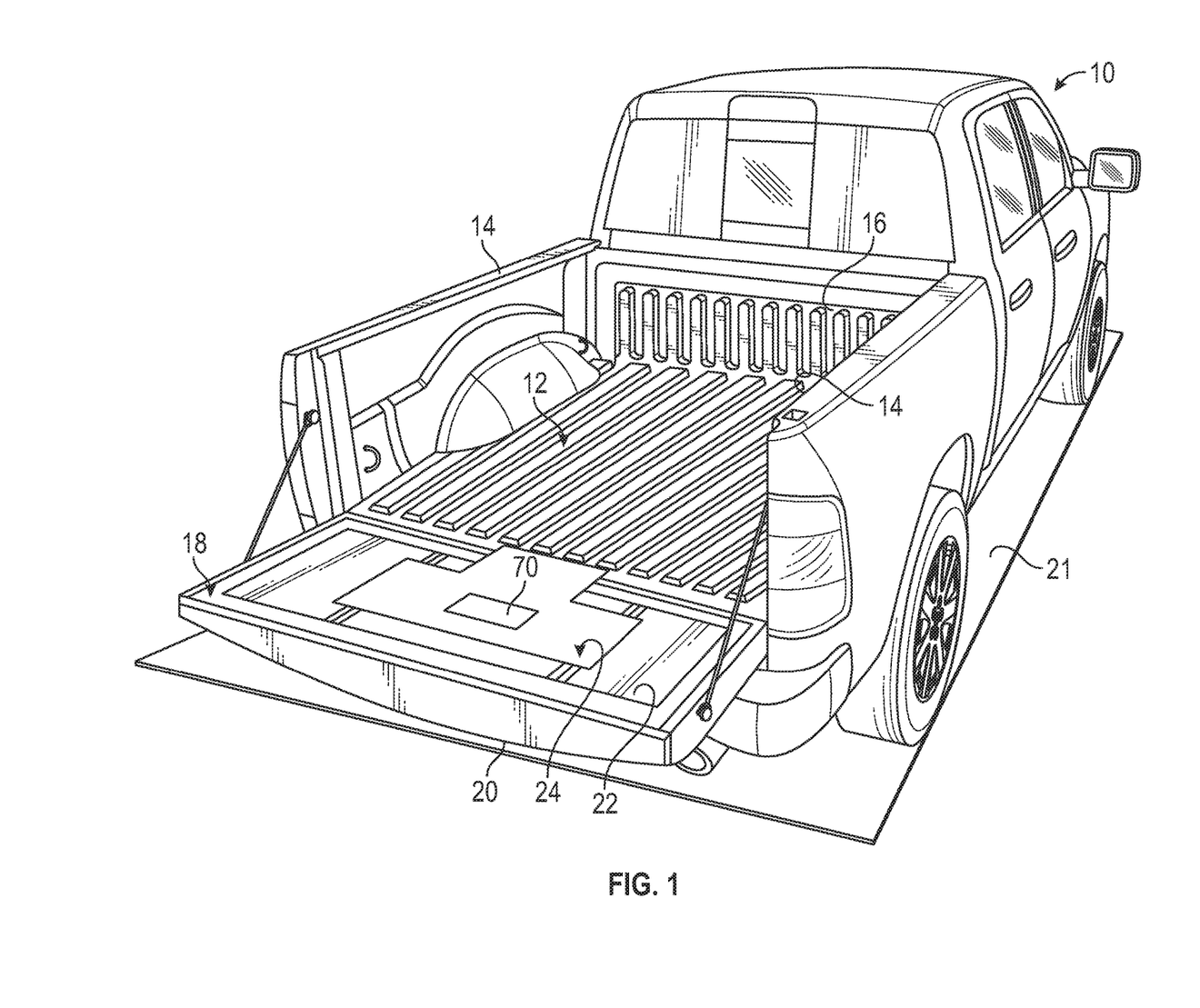
FIG. 1 illustrates a vehicle equipped with a tailgate accessory mounting system.

FIG. 1 schematically illustrates a vehicle 10. In the illustrated embodiment, the vehicle 10 is a pickup truck. However, other vehicles could also benefit from the teachings of this disclosure. Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a cargo bed area 12 that is established by a pair of side walls 14, a front wall 16, and a tailgate 18. The tailgate 18 is moveable between a closed position (not shown) and a deployed or open position. When in the closed position, the tailgate 18 generally encloses an end of the cargo bed area 12 that is opposite from the front wall 16 to prevent items from sliding out of the vehicle 10. The tailgate 18 may be pivoted from the closed position to the open position to provide access to the cargo bed area 12. When in the open position, cargo can be loaded and/or unloaded from the vehicle 10.

The tailgate 18 has an external surface 20 and an internal surface 22. The internal surface 22 faces the cargo bed area 12 when the tailgate 18 is positioned in the closed position. When pivoted and lowered to the open position, the internal surface 22 of the tailgate 18 is generally parallel to a ground level 21.

The owner of the vehicle 10 may desire to use the tailgate 18 for purposes beyond simply opening and closing the cargo bed area 12. For example, it may be desirable to utilize the tailgate 18 as a work surface when working at a job site or as a seating/dining/recreational surface when tailgating. The vehicle 10 may therefore be equipped with an accessory mounting system 24 that is mounted to the tailgate 18. As discussed in greater detail below, the accessory mounting system 24 provides one or more surfaces for securing accessory devices 70 relative to the tailgate 18.

Figure 2:
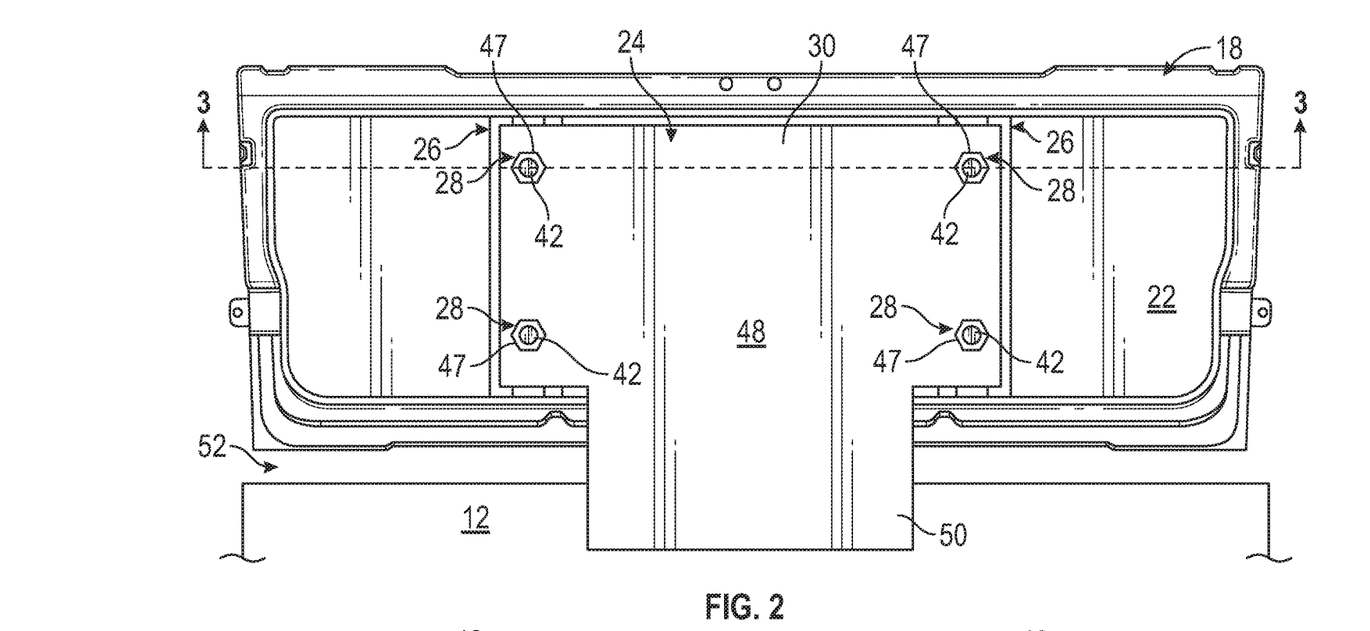
FIG. 2 illustrates an exemplary tailgate accessory mounting system.
Figure 3:
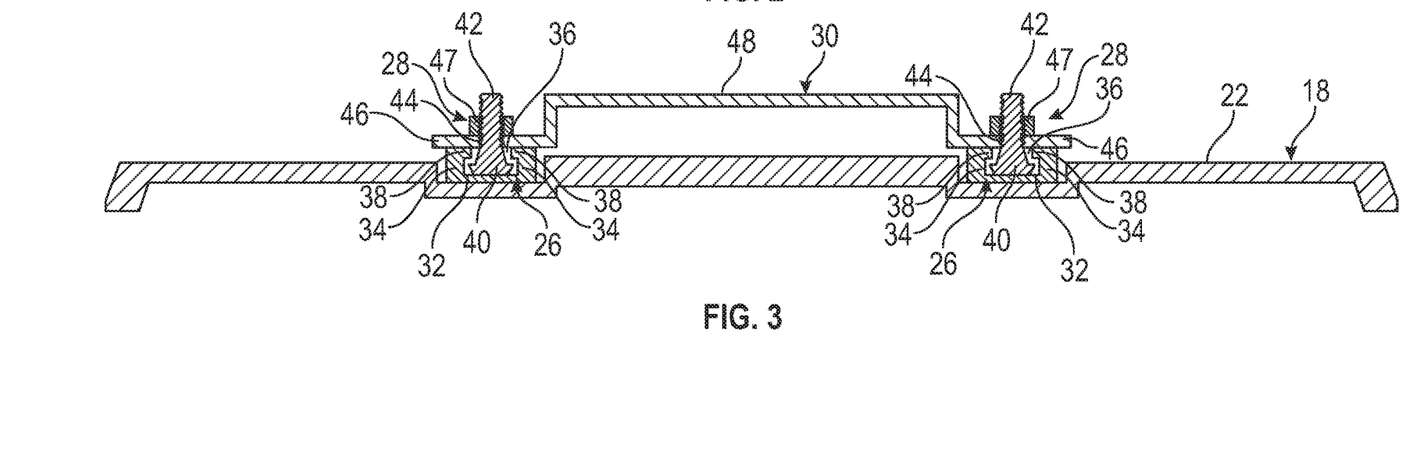
FIG. 3 is a cross-sectional view of the tailgate accessory mounting system of FIG. 2.

Referring now to FIGS. 1-3, the accessory mounting system 24 may be mounted to the internal surface 22 of the tailgate 18 once the tailgate 18 is moved to the open position. The accessory mounting system 24 may include one or more tracks 26, one or more anchoring bolts 28, and one or more mounting plates 30. In the illustrated embodiment, the accessory mounting system 24 includes two tracks 26 oriented in parallel to one another, four anchoring bolts 28, and a single mounting plate 30. However, a greater or fewer number of each of these components could be included as part of the accessory mounting system 24 within the scope of this disclosure.

In an embodiment, the tracks 26 function similarly to aircraft seat tracks and can be quickly and efficiently mounted to the tailgate 18. Each track 26 may include a bottom wall 32 and opposing side walls 34 that extend upwardly relative to the bottom wall 32. The bottom wall 32 and opposing side walls 34 circumscribe a slot 36 that extends along the length of the track 26. The slot 36 may be generally T-shaped, although other shapes are also contemplated as being within the scope of this disclosure. In another embodiment, each opposing side wall 34 includes an overhanging lip 38 that extends in a direction toward the opposite side wall 34. The overhanging lips 38 establish a varying width of the slot 36.

One or more anchoring bolts 28 may be slidably received within the slot 36 of each track 26. Each anchoring bolt 28 may include a platform 40 and a shaft 42 that protrudes outwardly from the platform 40. In an embodiment, the platform 40 of the anchoring bolt 28 is slidably received within the slot 36 of the track 26 and the shaft 42 extends to a location outward of the slot 36 for connecting the mounting plate 30 to the track 26. The platform 40 may be received between the overhanging lips 38 and the bottom wall 32 of the track 26. The overhanging lips 38 prevent the anchoring bolt 28 from being removed outwardly through the top of the track 26.

The mounting plate 30 may include multiple openings 44 for securing the mounting plate 30 to each track 26. In an embodiment, the openings 44 are formed through outer flanges 46 of the mounting plate 30. The total number and location of the openings 44 are not intended to limit this disclosure. The openings 44 receive the shafts 42 of the anchoring bolts 28 to position the mounting plate 30 over top of the tracks 26. The mounting plate 30 may then be fixedly secured to the tracks 26 by attaching an anchoring nut 47 over each shaft 42.

In an embodiment, the mounting plate 30 further includes a work surface 48. The work surface 48 is a generally flat surface suitable for use as a work space and/or for attaching an accessory device 70 (see FIG. 1) relative to the tailgate 18. The work surface 48 may protrude outwardly from the outer flanges 46 such that it is positioned within a plane that extends above the internal surface 22 of the tailgate 18.

In another embodiment, the mounting plate 30 includes a blocking extension 50 (see FIG. 2). The blocking extension 50 may protrude from the work surface 48 and extend across a gap 52 located between the tailgate 18 and the cargo bed area 12. The blocking extension 50 therefore prevents the tailgate 18 from being moved to the closed position when the mounting plate 30 is connected to the tracks 26 of the accessory mounting system 24. This helps ensure that vehicle owners will remove the mounting plate 30 from the tailgate 18 prior to driving the vehicle 10.

Figure 4:
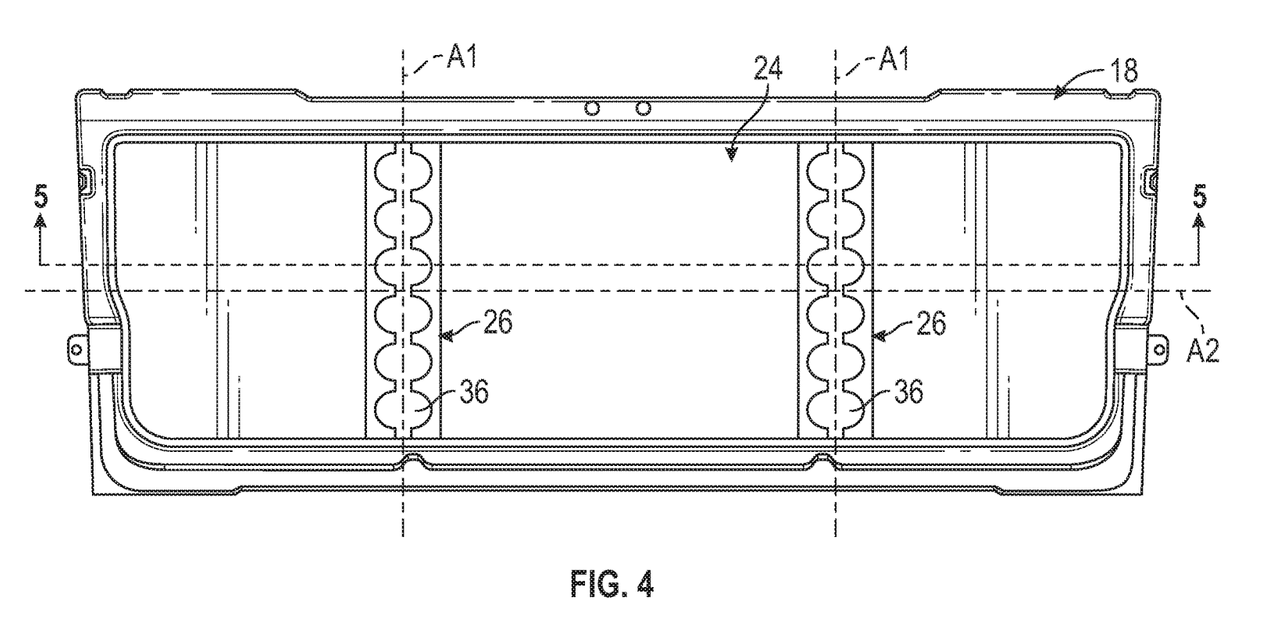
FIG. 4 illustrates the tailgate accessory mounting system of FIG. 2 with portions removed to better illustrate tracks of the system.
Figure 5:
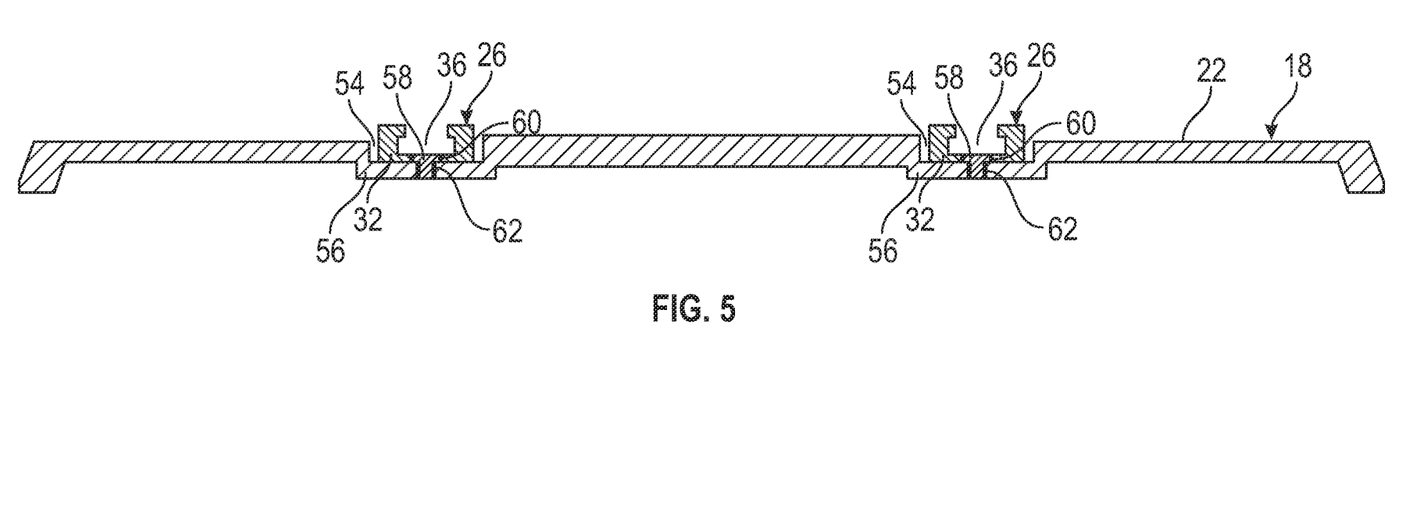
FIG. 5 is a cross-sectional view of the portion of the tailgate accessory mounting system shown in FIG. 4.
Figure 7:
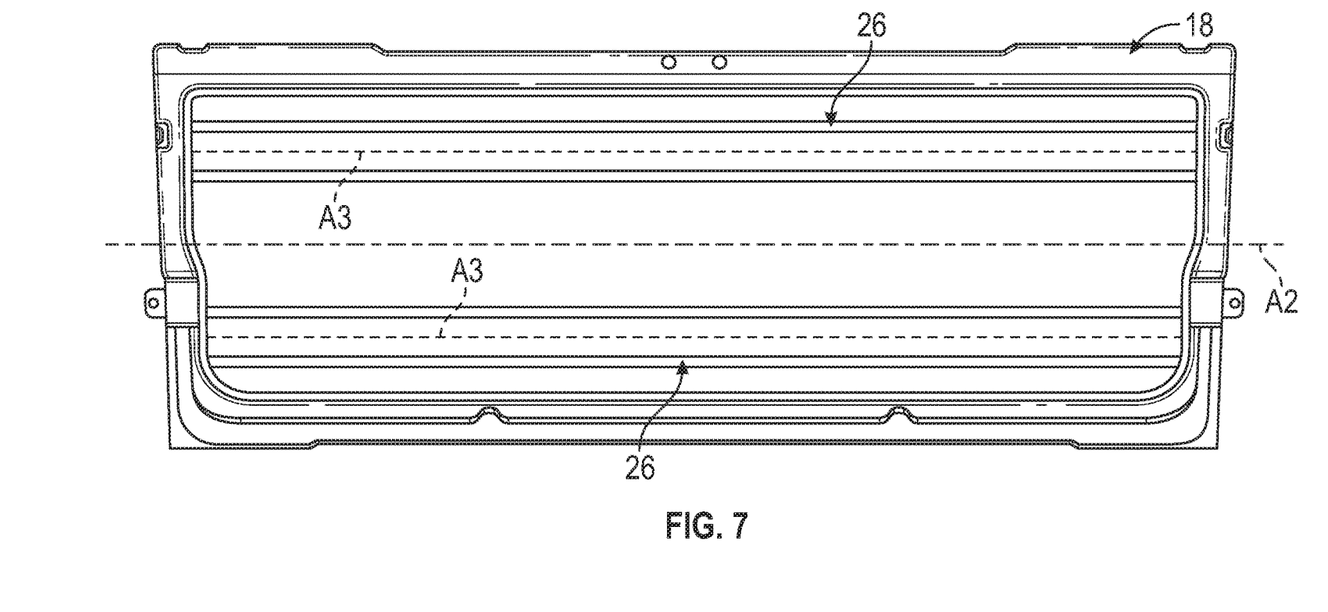
FIG. 7 illustrates an exemplary track positioning of a tailgate accessory mounting system.

FIGS. 4-5 illustrate the accessory mounting system 24 with the anchoring bolts 28 and the mounting plate 30 removed in order to better illustrate the tracks 26 and the track 26/tailgate 18 interface. In a first embodiment, each track 26 extends along a longitudinal axis A1 that is generally transverse (e.g., perpendicular) to a longitudinal axis A2 of the tailgate 18 (see FIG. 4). In a second embodiment, each track 26 extends along a longitudinal axis A3 that is generally parallel to the longitudinal axis A2 of the tailgate 18 (see FIG. 7).

Figure 6:
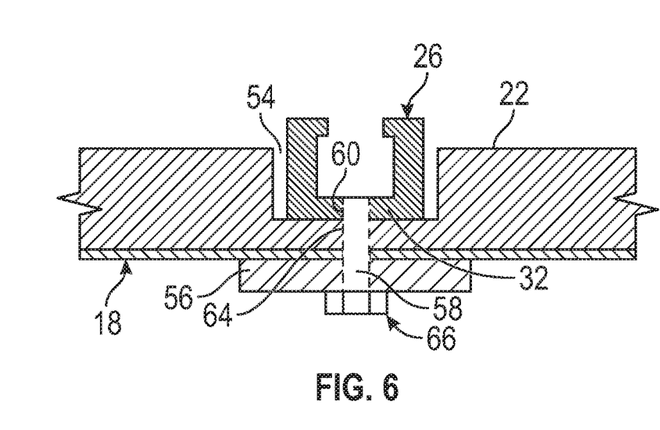
FIG. 6 illustrates an exemplary mounting configuration for mounting a track of a tailgate accessory mounting system to a tailgate.

As best illustrated in FIG. 5, each track 26 may be hard mounted to a portion of the tailgate 18. In an embodiment, each track 26 is received within a groove 54 formed in the internal surface 22 of the tailgate 18 and is secured directly to a reinforcement rail 56 of the tailgate 18. The tracks 26 may be positioned within the grooves 54 such that they either sit slightly proud of the internal surface 22 (see, e.g., FIG. 5) or sit substantially flush with the internal surface 22 (see, e.g., FIG. 6). The tracks 26 may be secured to the reinforcement rails 56 using one or more fasteners 58.

In a first embodiment, the fasteners 58 are threaded fasteners that extend through openings 60 formed in the bottom walls 32 of each track 26 and into threaded openings 62 formed in the reinforcement rails 56 (see, e.g., FIG. 5). In another embodiment, the fasteners 58 extend through openings 60 formed in the bottom walls 32 of each track, then through non-threaded openings 64 formed in the reinforcement rails 56, and are then secured within the openings 60, 64 via anchoring nuts 66 (see, e.g., FIG. 6). The fasteners 58 may be countersunk within the bottom walls 32 to avoid intruding into the slots 36.

Figure 8:
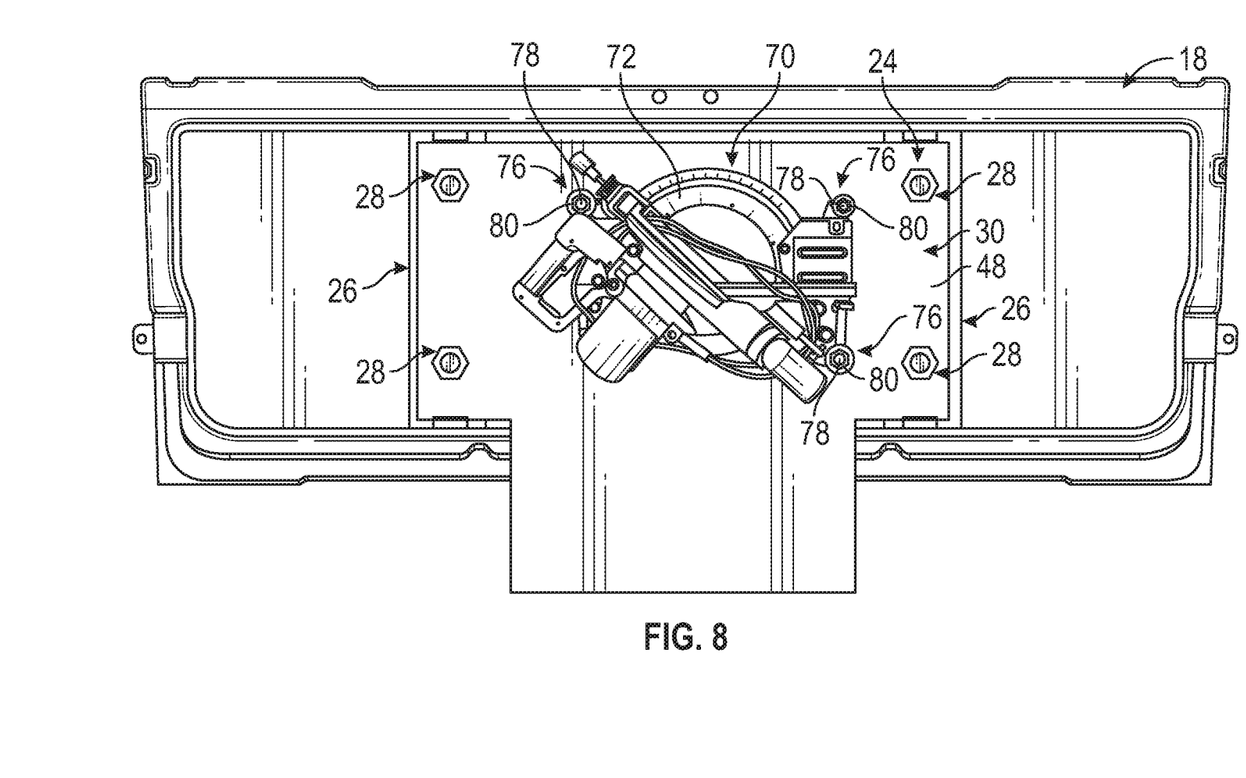
FIG. 8 illustrates a first exemplary accessory mounted to the tailgate accessory mounting system of FIG. 2.
Figure 9:
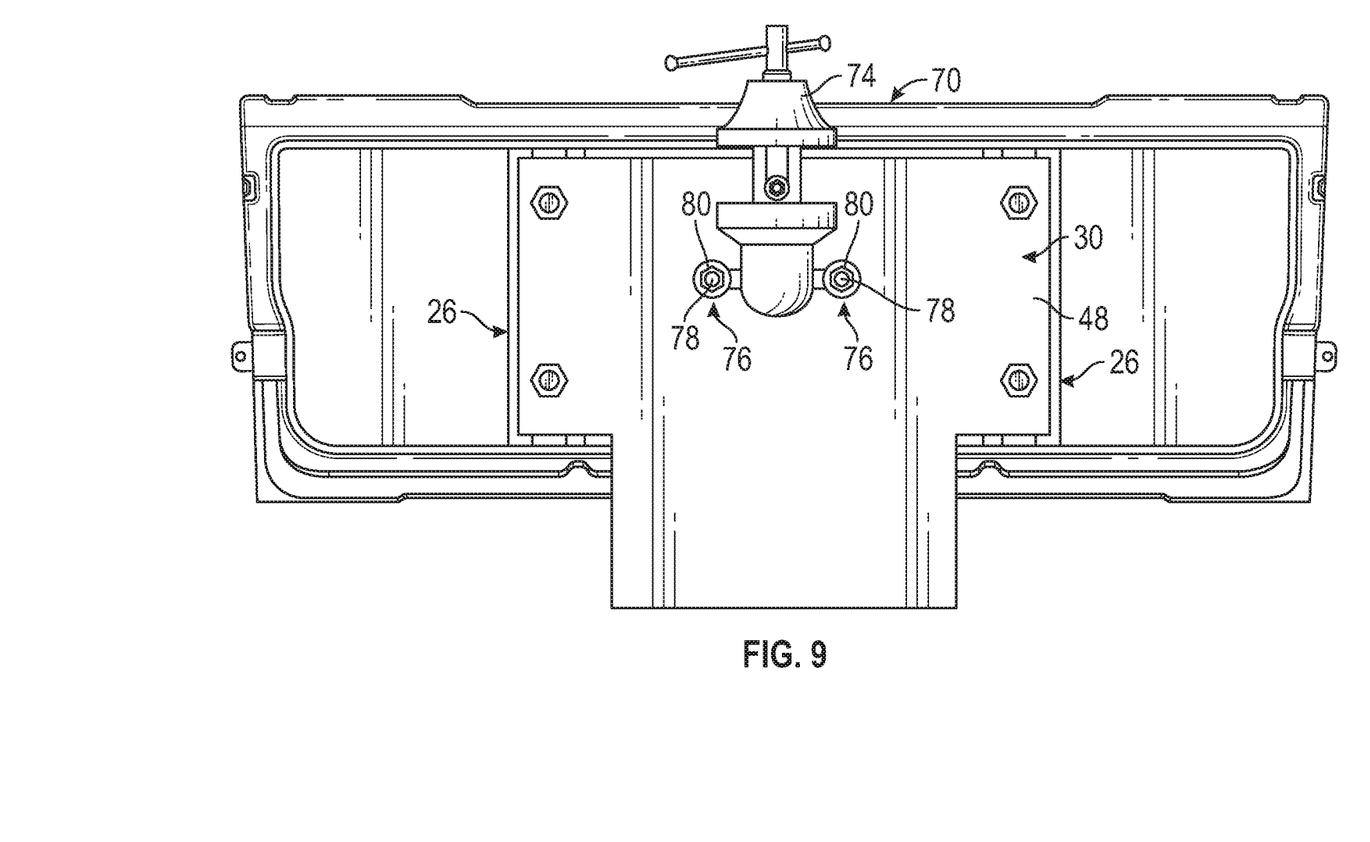
FIG. 9 illustrates a second exemplary accessory mounted to the tailgate accessory mounting system of FIG. 2.

As detailed above, the mounting plate 30 of the accessory mounting system 24 establishes a work surface 48 suitable for attaching various accessory devices 70 relative to the tailgate 18. FIGS. 8 and 9 schematically illustrate non-limiting examples of the types of accessory devices that may be secured relative to the tailgate 18 via the accessory mounting system 24. The accessory devices 70 could be any tool the owner of the vehicle 10 may desire to use when on a job site, for example. Referring first to embodiment of FIG. 8, the accessory device 70 is a miter saw 72. In the embodiment of FIG. 9, the accessory device 70 is a bench vice 74.

Each accessory device 70 can be hard mounted to the mounting plate 30 using one or more fastening assemblies 76. In an embodiment, each fastening assembly 76 includes an anchoring bolt 78 and an anchoring nut 80. However, other fastening assemblies are also contemplated within the scope of this disclosure.

The mounting plate 30 is made of a relatively easy drillable material for accommodating the mounting configuration of any accessory device 70. For example, openings can easily be formed in the mounting plate 30 for receiving the fastening assemblies 76 at locations of the mounting plate 30 that match the particular mounting configuration of the accessory device 70.

Figure 10:
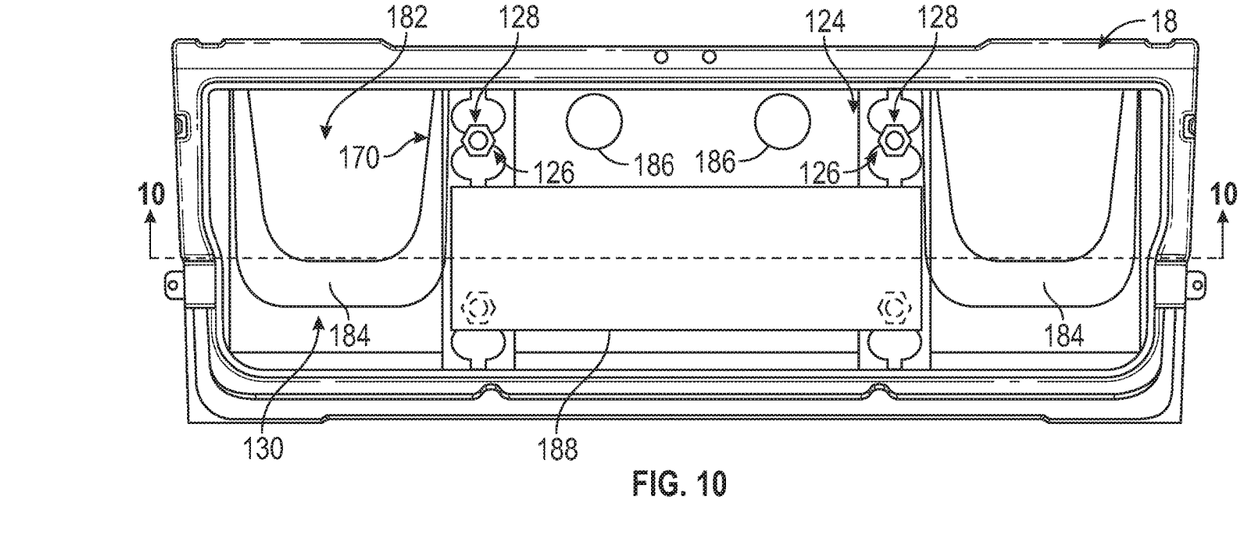
FIG. 10 illustrates another exemplary tailgate accessory mounting system.
Figure 11:
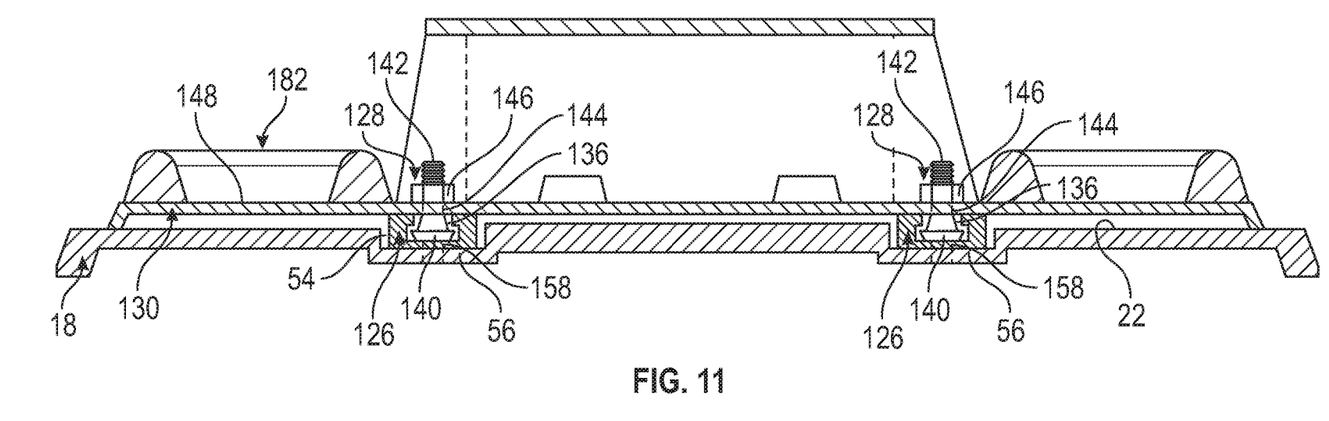
FIG. 11 is a cross-sectional view of the tailgate accessory mounting system of FIG. 10.

Another exemplary tailgate accessory mounting system 124 for mounting an accessory device 170 relative to a tailgate 18 is illustrated in FIGS. 10-11. In this embodiment, the accessory device 170 is a tailgating setup assembly 182 for utilizing the tailgate 18 as a seating/dining surface during a tailgating event or other social event. In embodiment, the tailgating setup assembly 182 include seats 184, cup holders 186, and a cooler 188. Of course, the tailgating setup assembly 182 could include various other configurations within the scope of this disclosure.

The accessory mounting system 124 is similar to the accessory mounting system 24 of FIGS. 1-9 and includes tracks 126, anchoring bolts 128, and a mounting plate 130. The tracks 126 may be hard mounted to a portion of the tailgate 18. In an embodiment, each track 126 is received within a groove 54 formed in the internal surface 22 of the tailgate 18 and is secured directly to a reinforcement rail 56 of the tailgate 18. The tracks 126 may be secured to the reinforcement rails 56 using one or more fasteners 158.

The anchoring bolts 128 may be slidably received within a slot 136 of each track 126. In an embodiment, a platform 140 of the anchoring bolt 128 is slidably received within the slot 136 of the track 126 and a shaft 142 extends to a location outward of the slot 136 for connecting the mounting plate 130 relative to the track 126.

The mounting plate 130 includes multiple openings 144 for securing the mounting plate 130 to each track 126. The total number and location of the openings 144 are not intended to limit this disclosure. The openings 144 receive the shafts 142 of the anchoring bolts 128 to position the mounting plate 130 over the tracks 126. The mounting plate 130 may then be fixedly secured to the tracks 126 by attaching an anchoring nut 146 over each shaft 142.

In an embodiment, the mounting plate 130 establishes a mounting surface 148 for mounting the tailgating setup assembly 182. In another embodiment, the mounting plate 130 is an integral component of the tailgating setup assembly 182 such that mounting the mounting plate 130 to the tracks 126 also secures the tailgating setup assembly 182 relative to the tailgate 18.

The tailgate accessory mounting systems of this disclosure establish surfaces for securing accessory devices to vehicle tailgates. Among many other potential uses, the accessory mounting systems described herein can be used on job sites for establishing a work surface or during social events (e.g., tailgating) for establishing a seating/dining/recreational surface on the tailgate. The accessory mounting systems therefore provide added versatility to existing vehicle tailgates.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tailgate accessory mounting system, comprising:
   a tailgate;
   a first track mounted to the tailgate;
   a first anchoring bolt slidably received within a slot of the first track;
   a mounting plate secured to the first track by the first anchoring bolt,
   wherein the first track is received within a groove of the tailgate,
   wherein the first anchoring bolt includes a platform received within the slot and a shaft that extends from the platform to a position outside of the slot; and
   an anchoring nut received over the shaft to secure the mounting plate to the first track.

2. The system as recited in claim 1, comprising a second track and a second anchoring bolt slidably received within a slot of the second track.

3. The system as recited in claim 2, wherein the mounting plate is secured to the second track by the second anchoring bolt.

4. The system as recited in claim 1, wherein the first track includes a bottom wall and opposing side walls that extend upwardly from the bottom wall, the bottom wall and the opposing side walls circumscribing the slot.

5. The system as recited in claim 1, wherein the first track is bolted to a reinforcement rail of the tailgate.

6. The system as recited in claim 1, wherein the first track extends along a first longitudinal axis that is transverse to a second longitudinal axis of the tailgate.

7. The system as recited in claim 1, comprising an accessory device mounted to the mounting plate.

8. The system as recited in claim 7, wherein the accessory device is a saw or a vice.

9. The system as recited in claim 7, wherein the accessory device is a tailgating setup assembly.

10. A vehicle, comprising:
   a tailgate; and
   an accessory mounting system secured to the tailgate and including:
      a track secured to the tailgate;
      an anchoring bolt received within the track;
      a mounting plate secured to the track by the anchoring bolt,
      wherein the track is received within a groove of the tailgate, and
      an anchoring nut received over the anchoring bolt to secure the mounting plate to the track.

11. The vehicle as recited in claim 10, wherein the vehicle is a pickup truck.

12. The vehicle as recited in claim 10, wherein the track is secured to a reinforcement rail of the tailgate.

13. The vehicle as recited in claim 10, wherein the track sits flush with an internal surface of the tailgate.

14. The vehicle as recited in claim 10, wherein the track protrudes outwardly of an internal surface of the tailgate.

15. The vehicle as recited in claim 10, wherein the mounting plate includes a blocking extension that extends across a gap between the tailgate and a cargo bed area of the vehicle.

16. The vehicle as recited in claim 10, comprising an accessory device mounted to the mounting plate.

17. The vehicle as recited in claim 16, wherein the accessory device is a saw or a vice.

18. The vehicle as recited in claim 16, wherein the accessory device is a tailgating setup assembly.

19. The system as recited in claim 1, wherein the track is stationary relative to the tailgate and the first anchoring bolt slides within the slot to position the first anchoring bolt relative to an opening of the mounting plate.

20. The system as recited in claim 1, wherein the first track is mounted to the tailgate by at least one threaded fastener.

21. A tailgate accessory mounting, comprising:
   a tailgate;
   a first track mounted to the tailgate;
   a first anchoring bolt slidably received within a slot of the first track;
   a mounting plate secured to the first track by the first anchoring bolt,
   wherein the first track is received within a groove of the tailgate,
   wherein the first track is mounted to the tailgate by at least one threaded fastener; and
   comprising a first anchoring nut attached to the first anchoring bolt and a second anchoring nut attached to the at least one threaded fastener.

22. The system as recited in claim 1, wherein the mounting plate includes a work surface that protrudes outwardly from outer flanges of the mounting plate.

23. A vehicle, comprising:
   a tailgate including a reinforcement rail; and
   an accessory mounting system securable to the tailgate, the accessory mounting system including:
      a track received within a groove of the tailgate and mounted to the reinforcement rail;
      a threaded fastener that secures the track to the reinforcement rail;
      an anchoring bolt slidably received within the track; and
      a mounting plate secured relative to the track by the anchoring bolt.

24. The vehicle as recited in claim 23, comprising an anchoring nut received over the anchoring bolt to secure the mounting plate to the track.

* * * * *